United States Patent [19]

Farrauto et al.

[11] Patent Number: 5,552,360
[45] Date of Patent: Sep. 3, 1996

[54] SUBSTRATE CONFIGURATION FOR CATALYTIC COMBUSTION SYSTEMS

[75] Inventors: Robert J. Farrauto, Westfield; Jennifer S. Feeley, Clinton; Dianne O. Simone, Edison; Yiu K. Lui, Parlin; Teresa Kennelly, Belle Mead, all of N.J.

[73] Assignee: Engelhard Corporation, Iselin, N.J.

[21] Appl. No.: 222,353

[22] Filed: Apr. 4, 1994

Related U.S. Application Data

[63] Continuation of Ser. No. 26,376, Mar. 4, 1993, abandoned.

[51] Int. Cl.$^6$ ............................ B01J 21/04; B01J 21/08; B01J 21/10; B01J 27/224
[52] U.S. Cl. .................... 502/178; 502/439; 502/527; 431/7
[58] Field of Search ............................ 502/178, 439, 502/527; 431/7

[56] References Cited

U.S. PATENT DOCUMENTS

| | | | |
|---|---|---|---|
| 3,056,646 | 11/1975 | Cohn | 502/332 X |
| 3,928,961 | 12/1975 | Pfefferle | 431/7 X |
| 4,019,316 | 4/1977 | Pfefferle | 431/7 X |
| 4,065,917 | 1/1978 | Pfefferle | 431/6 X |
| 4,154,568 | 5/1979 | Kendall et al. | 431/7 |
| 4,893,465 | 1/1990 | Farrauto et al. | 502/38 X |
| 5,047,381 | 9/1991 | Beebe | 502/304 |
| 5,055,442 | 10/1991 | Osaka et al. | 502/439 |
| 5,079,064 | 1/1992 | Forsythe | 428/131 |
| 5,102,639 | 4/1992 | Chou et al. | 502/302 X |
| 5,171,728 | 12/1992 | Sakurai et al. | 502/178 |

FOREIGN PATENT DOCUMENTS

| | | | |
|---|---|---|---|
| 58-92729 | 6/1983 | Japan . | |
| 58-184427 | 10/1983 | Japan . | |
| 60-152823 | 8/1985 | Japan . | |
| 61-295407 | 12/1986 | Japan | F23D 14/18 |
| 61-291820 | 12/1986 | Japan | F23D 14/18 |
| 1067259 | 3/1989 | Japan | B01J 37/02 |
| 8202007 | 6/1982 | WIPO . | |
| 9209849 | 6/1992 | WIPO . | |
| 9209365 | 6/1992 | WIPO . | |
| 9209848 | 6/1992 | WIPO . | |
| 9218243 | 10/1992 | WIPO . | |

OTHER PUBLICATIONS

Catalytically Stabilized Combustion by W. C. Pfefferle & L. D. Pfefferle, Prog. Energy Combust. Sci. 1986, vol. 12, pp. 25–41.

*Primary Examiner*—Douglas J. McGinty
*Attorney, Agent, or Firm*—Richard A. Negin

[57] ABSTRACT

A combustor for supporting the catalytic combustion of a gaseous carbonaceous fuel/air combustion mixture contains a catalyst zone in which is disposed a catalyst body comprising at least a first and a second catalyst member and further contains a downstream zone where homogeneous combustion occurs. Each catalyst member is comprised of a carrier body having a catalyst material deposited thereon. The first carrier is made of a silica-magnesia-alumina material comprised primarily of cordierite, mullite and corundum and the second carrier is made of a ceramic fiber matrix material comprising ceramic (alumina-boron oxide-silica) fibers in a silicon carbide matrix.

23 Claims, 8 Drawing Sheets

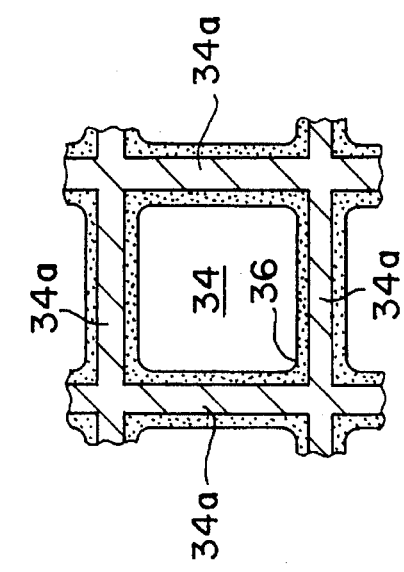
FIG. 2A
FIG. 2B
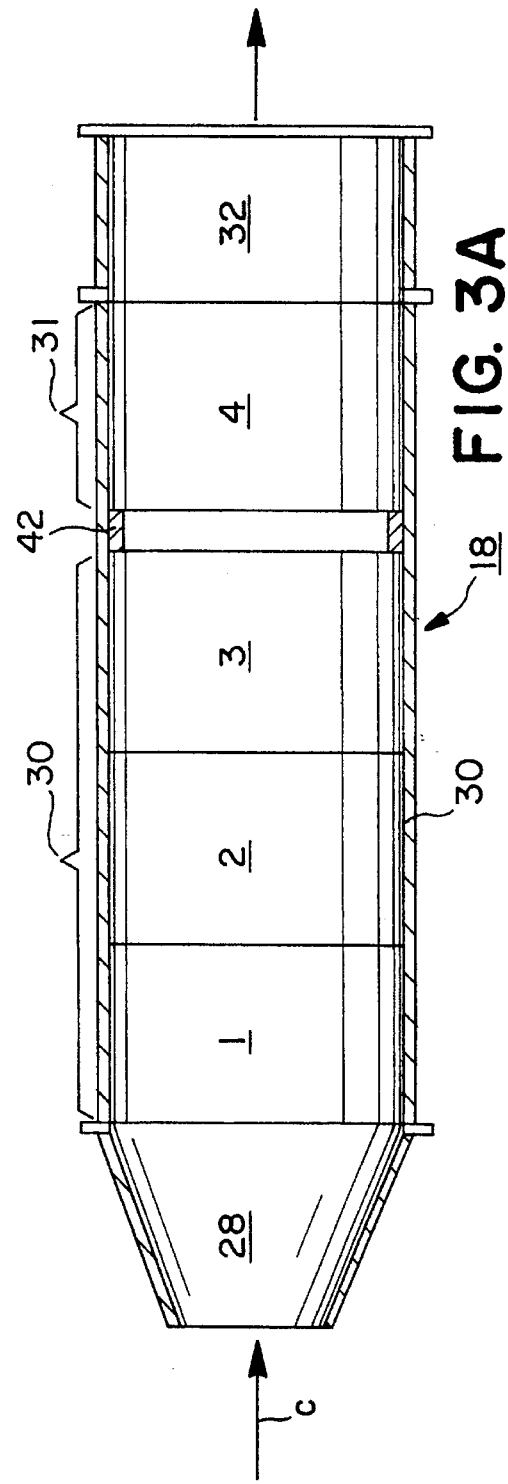
FIG. 3A

SUBSTRATE CONFIGURATION FOR CATALYTIC COMBUSTION SYSTEMS

This is a continuation of application Ser. No. 08/026,376 filed Mar. 4, 1993, now abandoned.

BACKGROUND OF THE INVENTION

1. Field of the Invention

The present invention relates to an apparatus and process for the catalytically supported combustion of gaseous carbonaceous materials, including natural gas and methane. In a more specific aspect, this invention relates to an apparatus and process for catalytically supported combustion of natural gas or methane using a supported palladium oxide catalyst.

2. Description of Related Art

Catalytically supported combustion processes have been described in the prior art, e.g., see U.S. Pat. No. 3,928,961 to Pfefferle and U.S. Pat. Nos. 4,065,917 and 4,019,316. The use of natural gas or methane in catalytic combustion has been taught in the art, as has the use of a palladium catalyst to promote such combustion oxidation. See U.S. Pat. No. 3,056,646 to Cohn, wherein the use of palladium catalyst to promote methane oxidation is disclosed, as is an operable temperature range of 271° C. to 900° C. (see column 2, lines 19–25).

U.S. Pat. No. 4,154,568 to Kendall et al, dated May 15, 1979 discloses a catalyst bed design comprising a plurality of carrier monoliths in the flow stream of the air/fuel mixture, wherein the channel size in respective monoliths decreases progressively for monoliths at progressively downstream positions, to provide substantially complete combustion in the catalyst bed (see column 1, lines 47–59).

SUMMARY OF THE INVENTION

The present invention provides a combustor for catalytically promoting thermal combustion of an inlet combustion gas mixture flowed therethrough in a flow path which passes sequentially through a catalyst zone and then a downstream zone of the combustor, there being a homogeneous reaction zone within the downstream zone. The combustor comprises a catalyst body disposed in the catalyst zone and comprising at least a first catalyst member and a second catalyst member. The first catalyst member is comprised of a first carrier having a plurality of gas flow channels extending therethrough and defined by channel walls on which a first catalyst composition is carried. The second catalyst member is disposed downstream of the first catalyst member and is comprised of a second carrier having a plurality of gas flow channels extending therethrough and defined by channel walls on which a second catalyst composition is carried. The first carrier comprises a silica-magnesia-alumina material comprised primarily of cordierite, mullite and corundum, and second carrier comprises a ceramic fiber matrix material comprising ceramic fibers. The composition of the ceramic of the fibers comprises alumina, boron oxide and silica and the ceramic fibers are fixed in a silicon carbide matrix.

The silica-magnesia-alumina material that comprises for example, the first carrier, may comprise about 20 to 40 weight percent $SiO_2$, about 3 to 6 weight percent MgO and about 54 to 77 weight percent $Al_2O_3$, with from about 50 to 90 percent by weight of each of said $SiO_2$, MgO and $Al_2O_3$ comprising crystalline material, the balance comprising amorphous material. The crystalline material may comprise about 15 to 40 percent by weight cordierite, about 15 to 35 percent by weight corundum and about 10 to 30 percent by weight mullite, based on the weight of the carrier.

The ceramic fiber of the ceramic fiber matrix material may comprise, for example, about 62 weight percent alumina, 14 weight percent boron oxide and 24 weight percent silica.

One aspect of the invention provides that the catalyst member may comprise respective discrete bodies disposed in proximity to each other, or in abutting contact with each other.

According to another aspect of the invention, the first catalyst composition may comprise palladium oxide dispersed on a first refractory metal oxide support.

The first refractory metal oxide support may be selected from the group consisting of one or more of unimpregnated alumina, alumina impregnated with a rare earth metal oxide, unimpregnated zirconia, zirconia impregnated with a rare earth metal oxide, silica, titania, and a co-formed rare earth metal oxide-zirconia. Similarly, the second catalyst composition may comprise palladium oxide dispersed on a second refractory metal oxide support which may be the same or different from the first refractory metal oxide support. For example, the first refractory metal oxide support may comprise unimpregnated alumina and the second refractory metal oxide support may comprise alumina impregnated with a rare earth metal oxide. The rare earth metal oxide may be selected from the group consisting of lanthana, ceria, praseodymia and combinations thereof. Alternatively, the first and second refractory metal oxide supports may both comprise alumina impregnated with a rare earth metal oxide.

Yet another embodiment of the invention provides that the first catalyst composition may comprise palladium oxide dispersed on a refractory metal oxide support and the second catalyst composition may comprise a combination of (i) the reaction product of palladium oxide and a metal oxide selected from the group consisting of one or more of samaria, lanthana and praseodymia admixed with (ii) a refractory metal oxide binder.

Another aspect of the invention provides that the combustor may comprise an intermediate catalyst member disposed in the catalyst zone between the first catalyst member and the second catalyst member. The intermediate catalyst member comprises a carrier comprising the silica-magnesia-alumina material and having a plurality of gas flow channels therethrough and defined by channel walls on which is disposed an intermediate catalyst composition. The intermediate catalyst composition may comprise palladium oxide dispered on an intermediate refractory metal oxide support. The intermediate refractory metal oxide support may comprise alumina, which may optionally be impregnated with a rare earth metal oxide, e.g., lanthana, ceria, praseodymia or combinations thereof.

According to still another aspect of the invention, the combustor may comprise a third catalyst member disposed in the catalyst zone downstream of the second catalyst member, and may comprise a carrier comprising the ceramic fiber matrix material and having a plurality of gas flow channels therethrough and defined by channel walls on which is disposed a third catalyst material. The third catalyst material may be selected from the group consisting of (a) palladium oxide dispersed on a refractory metal oxide support as described above and (b) a combination of (i) the reaction product of palladium oxide and a metal oxide selected from the group consisting of one or more of samaria, lanthana and praseodymia admixed with (ii) a refractory metal oxide binder. The binder may be selected from the group consisting of one or more of silica, alumina, titania and zirconia or alumina impregnated with a rare earth metal oxide, or combinations thereof.

As used herein and in the claims, the terms "upstream" and "downstream" refer to the relative placement of elements sensed in the direction of flow of the combustion mixture through a catalyst apparatus according to the invention.

BRIEF DESCRIPTION OF THE DRAWINGS

FIG. 2A is a view taken along line A—A of FIG. 2 showing a cross section of catalyst member 1 of FIG. 2;

FIG. 2B is a view, greatly enlarged with respect to FIG. 2A, showing in cross section one of the gas flow channels of catalyst member 1;

FIG. 3A is a view similar to that of FIG. 2 of a catalyst bed according to the present invention comprising a spacing member;

DETAILED DESCRIPTION OF THE INVENTION AND SPECIFIC EMBODIMENTS THEREOF

Figure 1:
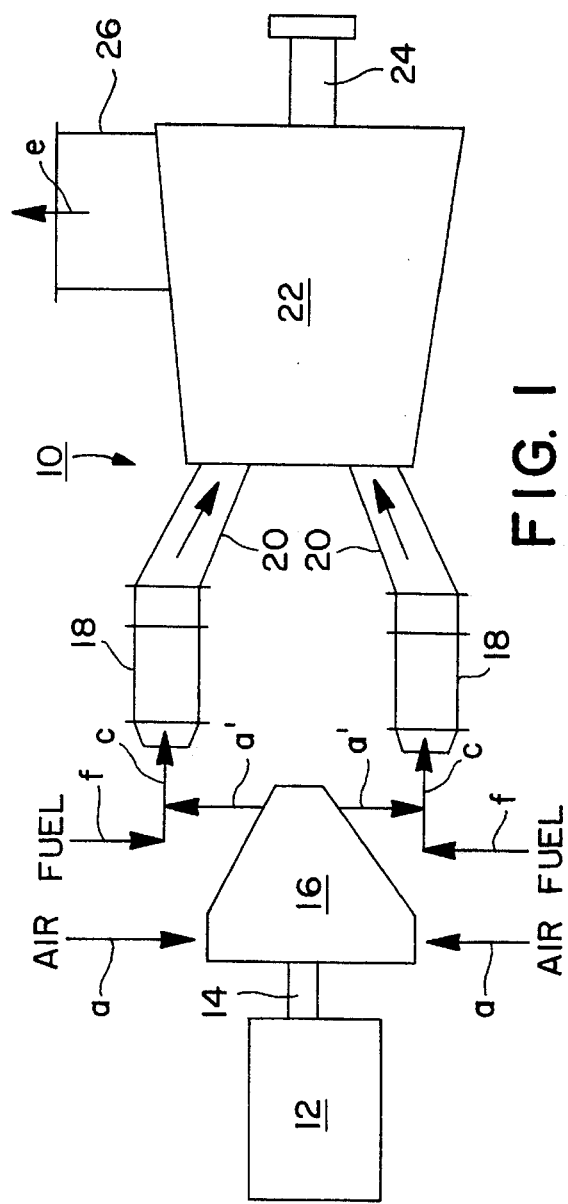
FIG. 1 is a schematic plan view of a gas turbine unit utilizing catalytic thermal combustors in accordance with one aspect of the present invention.

Burning of carbonaceous fuels is associated with formation of air pollutants, among the most troublesome of which are nitrogen oxides ($NO_x$). Nitrogen oxides form whenever air-supported combustion takes place at open-flame temperatures. One approach to eliminating nitrogen oxides involves catalytic post-treatment to reduce $NO_x$ to nitrogen. A more economical method is to operate the combustion process catalytically, at a temperature lower than open-flame temperatures.

It has long been realized that little or no $NO_x$ is formed in such a system. Typically, such catalytic combustion of natural gas or methane, for example, utilizes a preburner or thermal combustor which employs flame combustion to preheat combustion air to a temperature of 400° C. or higher.

Once the catalyst is sufficiently hot to sustain catalysis, the preburner is shut down and all the fuel and air are directed to the catalyst. Such a catalytic combustor, if operated at temperatures below about 1300° C. to 1500° C., avoids or at least controls to acceptable levels the $NO_x$ formation which occurs at the higher temperatures which are characteristic of the flame combustion. However, such catalytic combustion which will function effectively at a high space velocity has heretofore been generally regarded as commercially unattractive. Reasons for this lack of commercial attractiveness include the difficulty of economically combusting methane, the principal component of natural gas, and the deactivation and instability of the catalyst compositions employed, especially in the high-temperature end of the catalyst bed where severe high temperatures may be reached. Because of the susceptibility of the catalyst to such thermal deactivation, many catalytic combustor designs are limited with respect to the type and amount of fuel they can combust in order to avoid deleterious high temperatures.

Conventionally, combustors comprise a catalyst zone where heterogeneous combustion of the combustion mixture is catalytically initiated, and a downstream zone where homogeneous combustion occurs, supported by the heterogeneous combustion reaction. A catalyst body is disposed in the catalyst zone and comprises at least a first catalyst member comprising a carrier coated with a catalyst material. Generally, the catalyst material comprises a catalytically active metal, such as palladium oxide, dispersed on a refractory metal oxide support material. As will be illustrated below, the catalyst zone may comprise additional catalyst members which may comprise catalyst materials which may be the same or different from the first catalyst material. In such cases, the catalyst members are sometimes collectively referred to herein as a catalyst bed. The catalyst members are adapted to initiate in the catalyst zone catalytically-supported, i.e., heterogeneous, combustion at the surfaces thereof and to support homogeneous combustion in the downstream zone, thus helping to avoid exposing catalyst compositions to deactivating temperatures and to limit the production of nitrogen oxides.

The carrier on which the catalyst composition is carried is typically a monolith having a plurality of fine gas flow passages extending therethrough, to provide a honeycomb-type structure. The gas flow passages (sometimes referred to as "cells") in the honeycomb structure are substantially parallel and defined by thin walls, and may be of any desired cross section such as square, rectangular, triangular or hexagonal shape. The number of channels per square inch of face surface, i.e., per cross-sectional square inch (cpsi), may vary, depending upon the particular application for which the catalyst bed is to be used. Such honeycomb-type carriers are commercially available having anywhere from about 9 to 600 or more cpsi. The substrate or carrier monolith desirably is porous and may (but need not) be relatively catalytically inert to the combustion reaction as compared to the active layers used in the invention.

The carrier should be refractory in nature, i.e., able to withstand thermal shock caused by the sudden increase or decrease in temperature experienced at start-up and shutdown of the combustor. The carrier should also have good thermal strength so that it does not develop structural flaws at the operating temperatures of the combustor, i.e., temperatures as high as 1,500° C. Conventional cordierite monoliths such as those used to support three-way catalysts for treating the exhaust gases of automotive internal combustion engines are generally not considered to be suitable in combustors of the present invention because they can melt or otherwise fail at combustor operating temperatures. Suitable carriers may comprise a combination of cordierite and other oxide materials, e.g., a mixture of alumina, mullite and cordierite. Such carriers have physical properties more suited to combustor operation than conventional ceramic substrates, typically used to carry catalysts used in the treatment of automotive exhaust gases, i.e., they exhibit better thermal strength and thermal shock resistance, and are commercially available, e.g., from the Dupont Company under the designation PRD-66. An elemental analysis of this material provided by the Dupont Company describes the material containing 70.4 weight percent $Al_2O_3$, 24.9 weight percent $SiO_2$ and 4.2 weight percent MgO. However, another analysis resulted in proportions of about 62.7–63.4 weight percent $Al_2O_3$, 31.2–31.3 weight percent $SiO_2$ and 5.4–5.7 weight percent MgO. Approximately 50 to 90 percent by weight of each of the $SiO_2$, MgO and $Al_2O_3$ may comprise crystalline material, the balance comprising amorphous material. Typically, the crystalline material comprises 15 to 40 percent cordierite, 15 to 35 percent corundum and 10 to 30 percent mullite by weight of the carrier. A more detailed description of this material may be found in U.S. Pat. No. 5,079,064, the disclosure of which is hereby incorporated herein by reference thereto. Carriers comprising such materials are sometimes referred to herein as Type I carriers.

The Applicants have discovered a mode of failure of catalyst members by physically examining the catalyst members after they have been subjected to combustor operating conditions. Specifically, they have found that over the course of prolonged use, some catalyst materials react with the carrier on which they are coated. The reaction, sometimes referred to herein as an interaction, has been observed between catalyst materials comprising alumina and Type I carriers and is believed to be caused by exposure of the catalyst members to high temperatures, in a mechanism involving steam present in the combustion gases. Although these catalyst members not only exhibit the primary indication of failure, i.e., a significant reduction in catalytic ability to initiate combustion, the observed catalyst material/carrier interaction sometimes accompanies a significant loss in the structural integrity of the catalyst member as well as a loss of significant quantities of catalytic metal from the catalyst material. These effects tend to be most pronounced when the catalyst member is placed at points more downstream within the catalyst zone, since the combustion reaction progresses as the combustion mixture flows downstream through the combustor, establishing an increasing temperature gradient at progressively downstream positions.

The Applicants have discovered a carrier monolith that exhibits significantly less interaction with alumina-containing catalyst materials than Type I carriers. Such monoliths are available from the Minnesota Mining and Manufacturing Co. (3M) under the trade designation "Siconex," and are described by the manufacturer as being formed from a series of layers of woven alumina-boria-silica inorganic fibers. The thus formed monoliths are then coated with silicon carbide in a vapor deposition process which is believed to enclose the fibers in a silicon carbide matrix. The silicon carbide matrix is believed to produce a silica coating on the surface of the silicon carbide matrix when the monolith is calcined. These monoliths have been found to exhibit long-term thermal strength. The 3M Company provided an assay of its Siconex monolith, which described the monolith as comprising about 70% by weight silicon carbide and about 30% by weight NEXTEL™ 312 ceramic fiber. The NEXTEL™ 312 ceramic fibers are described as comprising an alumina-boria-silica material comprising 62 weight percent $Al_2O_3$, 14 weight percent $B_2O_3$ and 24 weight percent $SiO_2$. As will be illustrated below, Siconex-type carriers have been found to resist deterioration due to interaction with alumina-containing catalyst materials disposed thereon. Such carriers are referred to herein as Type II carriers to distinguish from more conventional carriers referred to as Type I carriers described below.

A combustor according to the present invention is generally characterized in that at least one catalyst member comprises a catalyst disposed on a Type II carrier. Since the operating temperature in the combustor increases at points progressively downstream in the combustor, it is preferable to emplace catalyst members in the catalyst zone in a sequence in which the catalyst members exhibit increasing thermal stability at points increasingly downstream in the combustor. Accordingly, it is advantageous to employ the Type II carrier in at least a relatively downstream position in the catalyst bed. At more upstream positions, less thermally resistant carriers may be employed, and may in fact be preferred if they provide superior catalytic performance, as seen in Example 1 below.

It should be noted that a combustor according to the present invention may find utility not only for combusting methane or natural gas, but also for other fuels, e.g., number 2 fuel oil, jet fuel, normally liquid hydrocarbon fuels, alcohols, e.g., methanol, oxygenated hydrocarbons and even hydrogen, which may be reacted with carbon monoxide.

In addition to positioning carrier monoliths in catalyst beds according to their thermal stabilities or catalytic activities, the catalyst materials carried thereon may also be chosen selectively. Co-pending, commonly assigned patent application Ser. No. 08/024,707, filed on Mar. 1, 1993, now abandoned, addresses various catalyst materials and their advantageous relative sequence in the catalyst bed, and the disclosure of that application is hereby incorporated herein by reference. Briefly restated, the cited patent application teaches that catalyst materials should be disposed in relative upstream-downstream relation in order of at least one of decreasing catalyst activity, increasing thermal stability (i.e., escalating degradation temperature) or escalating and preferably overlapping regeneration temperature ranges.

Typically, catalyst materials for initiating the combustion of mixtures of carbonaceous fuels in air comprise a platinum group metal or oxide, such as palladium oxide, dispersed on a support material comprising a relatively inert refractory inorganic oxide such as alumina, e.g., gamma alumina, which is optionally impregnated with stabilizers, e.g., silica, baria, lanthana, ceria, etc., promoters or other additives. Other support materials such as silica, titania, unimpregnated zirconia, zirconia impregnated with a rare earth metal oxide, ceria, co-formed rare earth metal oxide-zirconia, zeolites, and combinations thereof, may also be employed. The palladium oxide is dispersed on the support material in a conventional manner, e.g., by impregnating particles of the support material with a solution of a soluble palladium compound, e.g., a solution of $Pd(NO_3)_2 \cdot 6H_2O$, by the incipient wetness method. The Pd is then fixed on the carrier by a conventional reduction reaction, e.g., with an aqueous hydrazine solution. The reduced catalyst is then dried, e.g., overnight at 120° C., and calcined, e.g., at 500° C. for 2 hours. Support materials may be stabilized against thermal degradation, e.g., by the impregnation of stabilizing species, to provide a catalyst material better suited for use at a relatively downstream position in the catalyst zone. Alternative active components may be employed, such as binary oxides of palladium and rare earth metals, which may be formed from the solid state reaction products of palladium oxide and oxide of a rare earth metal, such as samaria, lanthana, neodymia and/or praseodymia. Typically, such binary oxides are combined with a refractory metal oxide, such as alumina, to bind the material to a carrier. These catalytic materials are described in co-pending, commonly assigned U.S. patent application Ser. No. 07/684,409, filed Apr. 12, 1991, and commonly assigned U.S. patent application Ser. No. 07/684,631, filed Apr. 12, 1991, now U.S. Pat. No. 5,102,639. The disclosures of aforesaid patent application and issued patent are hereby incorporated herein by reference. However, the particular sequence of catalyst materials in a catalyst bed should not be viewed as a limitation of the present invention.

Catalyst failures may be alleviated in another respect by providing a thermal buffer or separator body disposed in a separator zone situated between the catalyst zone where the catalyst body is disposed and the downstream zone where high temperature homogeneous combustion occurs. The separator body is described more fully in co-pending, commonly assigned U.S. patent application Ser. No. 07/024,707, filed Mar. 1, 1993, now abandoned the disclosure of which is hereby incorporated herein by reference. Briefly restated, the separator body preferably comprises a monolith similar in configuration to the carriers on which catalyst material is deposited to form a catalyst member, i.e., it may take the form of a honeycomb monolith having a plurality of parallel gas flow passages extending therethrough. The separator body is made of a material that can withstand exposure to the high temperatures produced by the homogeneous combustion that occurs in a downstream zone of the combustor. Due to its placement between the catalyst zone and the downstream zone where homogeneous combustion occurs, the separator body acts as an insulator to partially insulate the catalyst body from the heat released by the homogeneous reaction. Preferably, the separator body does not comprise catalytically active materials. Thus, even when the downstream portion of the combustor bed is exposed to temperatures that would deactivate a catalytic material there need not be an associated loss in combustion efficiency since the catalyst bodies are shielded from such temperatures by the separator body. In some embodiments, the separator body may be disposed in close proximity to the catalyst member, i.e., it is either disposed in abutting relation to the catalyst body or is sufficiently close so that the channeled flow of gases through the catalyst body is substantially preserved as channeled flow through the separator body.

Preferably, the first catalyst member, each optional catalyst member and the separator body are discrete bodies within the combustor. For example, the first catalyst member will preferably comprise the first catalyst composition disposed on the first carrier and the second catalyst member will likewise comprise the second catalyst composition on a separate second carrier. Then, the first catalyst member and the second catalyst member may be disposed within the combustor in adjacent, optionally abutting, upstream/downstream relation to one another. The catalyst members, thus disposed in proximity to each other, are preferably disposed with their respective gas flow channels in mutual alignment. Thus, the flow of combustion gases through the first catalyst member will be channeled into the second catalyst member. If the two catalyst members are not abutting, they should be in close proximity, whereby the channeled gas flow is maintained between them. Alternatively, the first catalyst member the second catalyst member may be formed on a single, integral monolith by applying a coating of the first catalyst composition on one end of the monolith and a coating of the second catalyst composition on the other end of the monolith. The separator body, which also comprises a refractory body having a plurality of gas flow channels extending therethrough, may likewise be part of a single monolith with the second or most downstream catalyst member, with catalyst material being deposited on only one end of the monolith to provide a catalyst member, and the other end providing the separator body.

Referring now to FIG. 1 there is shown in schematic plan view a gas turbine 10 comprising a starter engine 12 connected by an engine shaft 14 to an air compressor 16, which is provided with inlet air, via air inlet lines indicated by arrows a, which is compressed by compressor 16 and discharged via lines a' into combustion gas inlet lines c which are also supplied with a pressurized gaseous fuel, such as natural gas or methane, via gas inlet lines indicated by arrows f. The air and fuel combine to form a combustion mixture which is introduced via lines c into a plurality of catalytic thermal combustors 18, two of which are illustrated in FIG. 1 although it will be appreciated that any suitable number may be employed. For example, eight such combustors 18 may be utilized with their outlets disposed equiradially about the inlet to the turbine. Each catalytic thermal combustor 18 is provided with an associated outlet duct 20 connected in gas flow communication with a turbine 22 which may comprise a multi-staged turbine as well known to those skilled in the art. Turbine 22 is drivingly connected to a load coupling shaft 24 to connect the turbine output to a suitable device, for example, an electric generator. The expended combustion products are exhausted as shown by arrow e via exhaust stack 26 for discharge to the atmosphere or for further use or processing.

Figure 2:
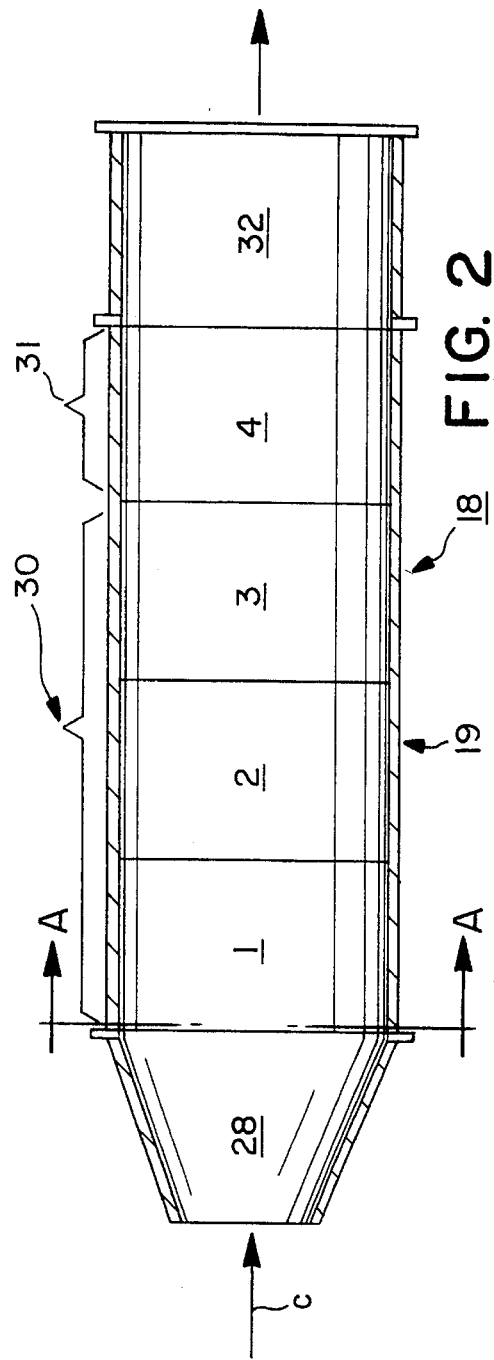
FIG. 2 is a schematic longitudinal cross-sectional view of one of the catalytic thermal combustors of FIG. 1 showing four cylindrical catalyst members arranged therein.

FIG. 2 shows a schematic cross-sectional view of a typical catalytic thermal combustor 18 comprising a cannister 19 having an inlet section 28, a catalyst zone 30 comprising a catalyst body comprising catalyst members 1, 2, and 3, and a separator zone 31 including a separator body 4 and a downstream zone 32. The three catalyst members 1, 2, and 3, and separator body 4 are arranged in abutting contact. That is, catalyst members 1 and 2 are positioned in face-to-face abutting contact, as are catalyst members 2 and 3. Catalyst member 3 and separator body 4 are also in abutting contact. Generally, the catalyst members 1, 2, and 3 comprise a refractory carrier substrate formed into what is sometimes referred to as a monolithic or honeycomb substrate or carrier. The carrier is a substantially cylindrical body (see FIG. 2A) having opposite end faces between which extend a plurality of generally parallel, fine gas flow passages. FIG. 2A shows a typical catalyst member end face 1a of catalyst member 1, schematically showing a plurality of fine, parallel gas flow passages extending longitudinally through catalyst member 1 to permit gas flow through catalyst member 1. This construction is typical of all the catalyst members 1 through 3 inclusively. The gas flow passages are defined by walls on which are disposed a coating (often referred to as a "washcoat") of an active material suitable to catalyze the oxidation of a gaseous fuel such as natural gas or methane.

FIG. 2B shows an enlarged view corresponding to FIG. 2A in which a typical gas flow passage 34 is shown in cross-sectional view as being defined by four gas flow passage walls 34a on which is coated a catalytic material washcoat 36. The cross-sectional configuration of gas flow passage 34 illustrated in FIG. 2B is rectangular but it will be appreciated that any suitable cross-sectional configuration may be employed such as square, polygonal, e.g., triangular, or circular. Further, the gas flow passages may have a configuration attained by alternating layers of flat and waveform plates made of a suitable refractory material, as is well known to those skilled in the art.

Preferably, separator body 4 is dimensioned and configured to provide gas flow channels that correspond with the channels in at least catalyst member 3, i.e., the catalyst member against which the separator body is disposed. This allows the gas stream to maintain channeled gas flow from the catalyst member through the separator body.

According to another aspect of the invention, there may be a spacing member 42 (FIG. 3A) between catalyst member 3 and separator body 4, to allow for improved intermingling of fuel and air before the combustion mixture again flows over a catalyst member.

Catalysts comprising palladium oxide dispersed on alumina may be prepared according to a procedure such as that described in U.S. Pat. No. 4,893,465, the disclosure of which is incorporated herein by reference. According to this procedure, gamma alumina is calcined at 950° C. for 2 hours and then screened to particle sizes of between 50 and 150 microns to provide an aged alumina which may be used as a catalyst carrier. The palladium oxide on alumina catalysts of the following examples were prepared by the aforesaid technique.

EXAMPLE 1

Two catalyst beds designated Bed A (run 58) and Bed B (run 60), each comprising four catalyst members designated 1–4 were prepared and arranged in a manner similar to the three-catalyst member arrangement of the catalyst section 30 of cannister 19 illustrated in FIG. 3A. The four segments of each bed are designated A1, A2, A3 and A4, and B1, B2, B3 and B4, respectively. In both cases, the catalyst member 1 (A1 and B1) is positioned at the first or most upstream position and the catalyst member 4 (A4 and B4) is positioned at the last or most downstream position, with catalyst members 2 (A2 and B2) and 3 (A3 and B3) in the same order as illustrated in FIG. 2. In Bed A, the carrier substrate for each catalyst member A1 through A4 was a Type I substrate having 64 cells per square inch. The substrate in catalyst member A1 was coated with a catalyst composition comprising palladium oxide dispersed on alumina, the washcoat containing 4% palladium by weight of the washcoat, as palladium oxide, by impregnating the alumina with a palladium nitrate solution and calcining the impregnated alumina. Catalyst member A2 comprised a catalyst material prepared by co-impregnating alumina with a solution of cerium nitrate and palladium nitrate and then calcining the impregnated alumina, to yield a material comprising 8 weight percent palladium by weight of the catalyst material as palladium oxide and ten weight percent ceria by weight of the catalyst material.

Catalyst members A3 and A4 each comprised an active layer comprising a catalyst composition prepared from a physical mixture of alumina with the solid state reaction product of lanthana and palladium oxide in a ratio of 2:1, respectively, to produce a binary oxide of $La_4PdO_7$. The binary oxide was produced by mixing an oxide of lanthana with palladium oxide in selected weight ratios. The mixture is mechanically ground to a size range of about 50 to 100 micron diameter particles. The grinding is followed by calcination in air, for example, at a temperature of about 1100° C. for about 66 hours, to provide a reaction mixture containing the binary oxide of palladium and lanthanum. Preferably, the lanthana and palladium oxide starting materials are mixed in stoichiometric proportions to produce the desired compound. Thus, the molar ratio for the lanthana to PdO in the reaction mixture may be 2:1, 1:1 or 1:2. Although it is not necessary to use the starting materials in the molar ratios of the desired binary oxide product, the use of such stoichiometric proportions has been found to be advantageous, as described in aforesaid U.S. patent application Ser. No. 07/684,409. The binary oxide comprised 7 weight percent of the catalytic material, the balance comprised alumina. Catalyst members A1, A2 and A3 were disposed in abutting relation to each other. The catalyst members A1 and A3 were 1.5" in length; catalyst member A2 was 1" in length. Catalyst member A4 was separated from catalyst member A3 by a spacing member 1" in length. The spacing member was an annular body disposed about the periphery of catalyst members A3 and A4, leaving the gas flow area between these catalyst members unobstructed.

Catalyst bed B was prepared using the same active layers on the catalyst member in the same order as described for bed A, except that the palladium loading on catalyst member B1 was 8% palladium, rather than 4% as in catalyst member A1. Further, in catalyst bed B, all the carrier monoliths were Type II substrates having 60 cells per square inch instead of 64 cells per square inch. Catalyst member B4 was separated from catalyst member B3 as was the case with catalyst members A3 and A4. The configuration of beds A and B are summarized in TABLE IA.

TABLE IA

| Catalyst Member | Substrate Type, | Length | Washcoat |
|---|---|---|---|
| | | | (Catalyst Bed A) |
| A1 | I | 1.5" | 4 wt. % Pd on alumina |
| A2 | I | 1" | 8 wt. % Pd; 10% ceria/alumina |
| A3 | I | 1.5" | 7 wt. % $2La_2O_3 \cdot PdO$/93% alumina |
| A4 | I | 1.5" | 7 wt. % $2La_2O_3 \cdot PdO$/93% alumina |
| | | | Catalyst Bed B |
| B1 | II | 1.5" | 8 wt. % Pd on alumina |
| B2 | II | 1" | 8 wt. % Pd; 10% ceria/alumina |
| B3 | II | 1.5" | 7 wt. % $2La_2O_3 \cdot PdO$/93% alumina |
| B4 | II | 1.5" | 7 wt. % $2La_2O_3 \cdot PdO$/93% alumina |

To compare the efficacy of the catalyst beds in igniting combustion, they were placed in a combustor through which an air/fuel mixture comprising methane in air was introduced at fixed velocities as set forth in TABLE IB below. The temperature of the inlet stream was increased until complete combustion of the fuel was attained, this temperature being reported as the ignition temperature. Combustion was sustained for a duration of some hours as shown in TABLE IB, and the inlet temperature was then reduced until combustion was extinguished, and the extinction temperature was noted. In some instances, the fuel content of the combustion mixture was reduced as well. The results are set forth below in TABLE IB.

TABLE IB

| OA | Fuel[a) Content | Inlet[b) Vel. | Ign.[c) Temp(°C.) | Time[d) (hrs.) | Extinction |
|---|---|---|---|---|---|
| Bed A | | | | | |
| Run 1 | 4% | 30 ft/s | 455 | 2 | 445 |
| Run 2 | 4% | 30 ft/s | 490 | 6.5 | 435 |
| Run 3 | 3.9% | 30 ft/s | 490 | 2.5 | 496(3.6% $CH_4$) |

TABLE IB-continued

| OA | Fuel[a] Content | Inlet[b] Vel. | Ign.[c] Temp(°C.) | Time[d] (hrs.) | Extinction |
|---|---|---|---|---|---|
| Run 4 Bed B | 4% | 30 ft/s | 570 | 3 | 582(3.5% CH₄) |
| Run 1 | 4% | 30 ft/s | 512 | 4 | 452–480 |
| Run 2 | 3.45% | 30 ft/s | bed did not initiate complete combustion at 590° | | |
| Run 3 | 4% | 50 ft/s | bed could not initiate complete combustion | | |

[a] Volume percent of methane in air.
[b] Linear velocity in feet per second of combustion gas at entry to catalyst beds.
[c] Ignition temperature in °C.
[d] Duration of combustion in hours.
[e] Temperature in °C. at which combustion was extinguished.

The data in TABLE IB show that catalyst bed A exhibited greater catalytic activity than catalyst bed B, as reflected by the generally lower ignition temperatures of catalyst bed A and the difficulty displayed in initiating combustion over bed B. This is surprising in view of the greater quantity of palladium oxide applied to segment B1 as compared to segment A1.

1. Bulk Assay Results

The catalyst material on catalyst members A4 and B4 were assayed for palladium and lanthanum content and the results of the respective assays were compared to those for fresh samples. The catalyst material disposed on catalyst member A4 (comprising a Type I substrate) showed a loss of 85.5% of palladium content from the catalyst coating, but no loss of lanthanum. The catalyst material on catalyst member B4 (comprising a Type II substrate) showed no loss of either catalytic metal.

2. SEM Microprobe/Mapping Results

Figure 4A:
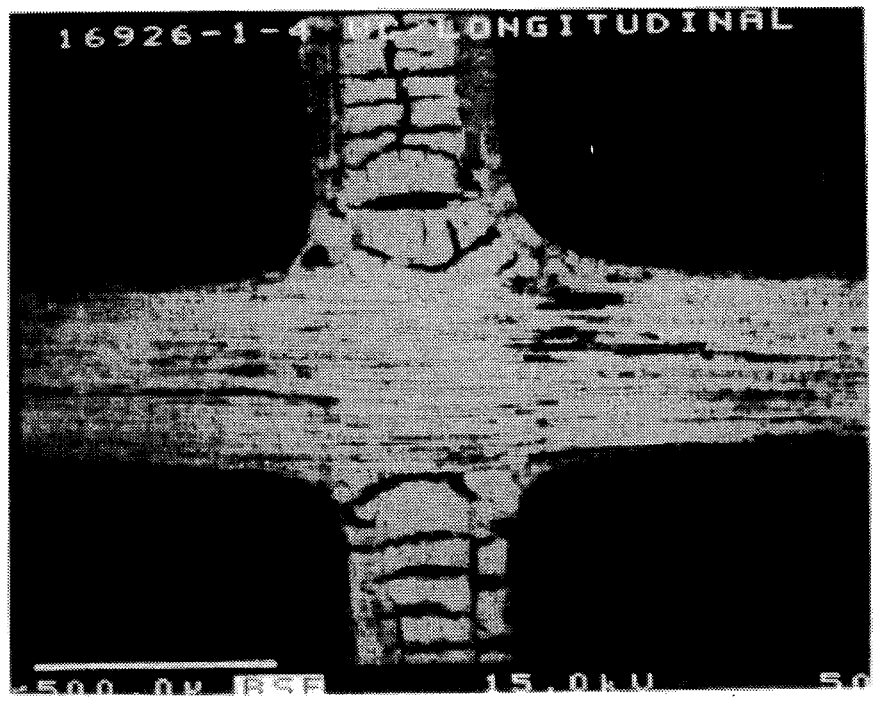
FIGS. 4A and 4B are scanning electron microscope ("SEM") photographs of cross sections of a fresh sample and the aged catalyst member A3, respectively, of Example 1 (Piece 3 fresh (4A) and spent (4B) Run 58)
Figure 4B:
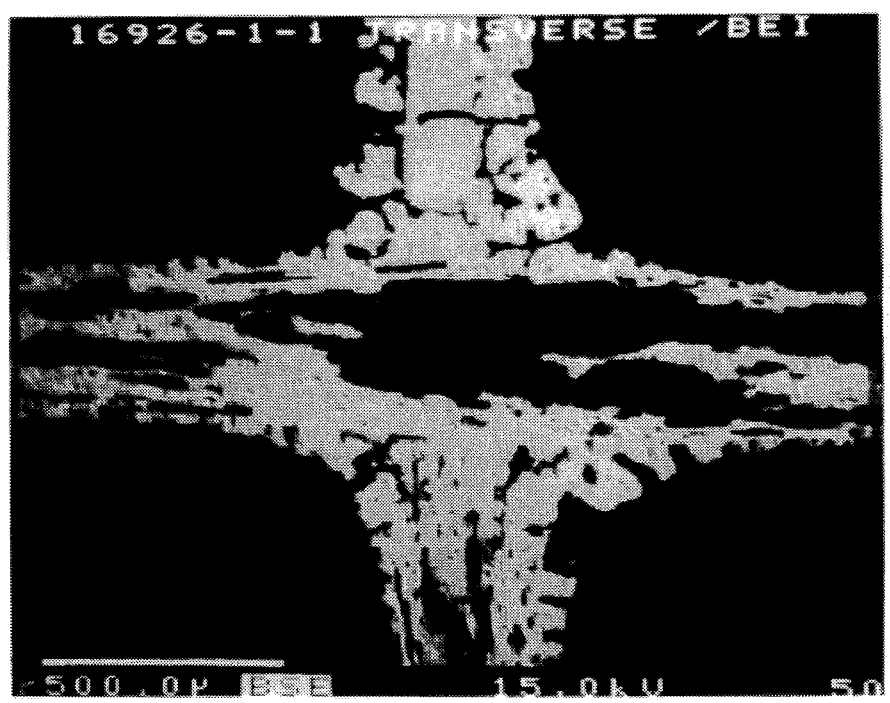

Sections of spent catalyst members A3 and B3 were examined by scanning electron microscope, as were samples of identical fresh catalyst members for comparison. The results were produced in the form of electron micrographs, i.e., "SEM photographs", which were visually examined for evidence of substrate or catalyst deterioration. The SEM photograph for catalyst member A3 (comprising a Type I substrate) is shown on the attached FIG. 4B next to that of the fresh catalyst on a Type I substrate shown in FIG. 4A. It is clear from FIG. 4B that the Type I substrate suffered a deterioration in the constituent fibers during the activity test. In addition, it appears that the catalyst washcoat was interacting with the substrate, as evidenced by the apparent movement of the washcoat/substrate interface toward the center of the substrate structure. Finally, a microprobe was used to determine the presence of palladium in the fresh and spent samples. No palladium was detected in the spent sample.

Figure 5A:
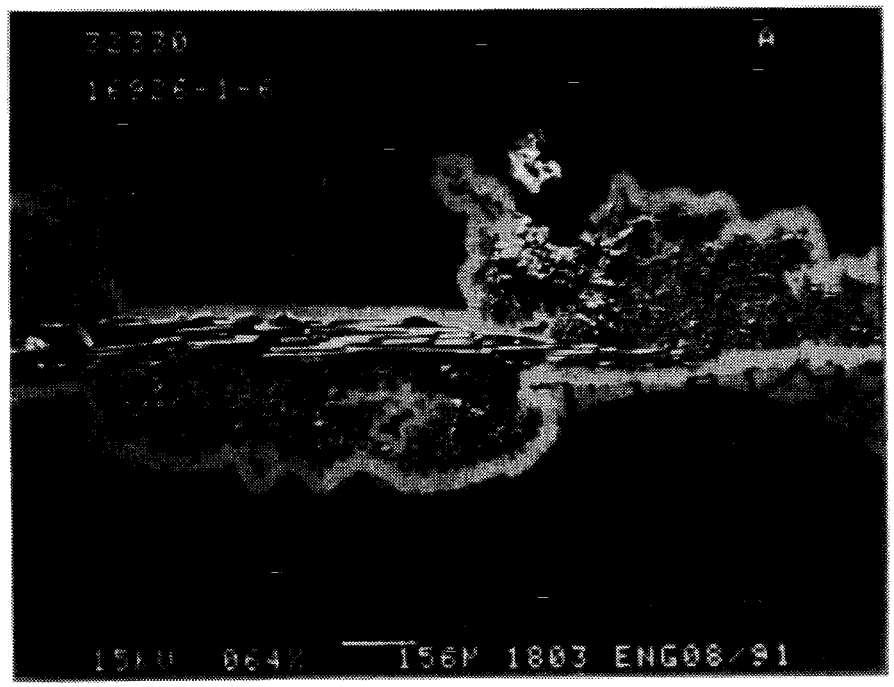
FIGS. 5A and 5B are SEM photographs of cross sections of a fresh sample and the aged catalyst member B3, respectively, of Example 1 (Piece 3 fresh (5A) and spent (5B) Run 60)
Figure 5B:
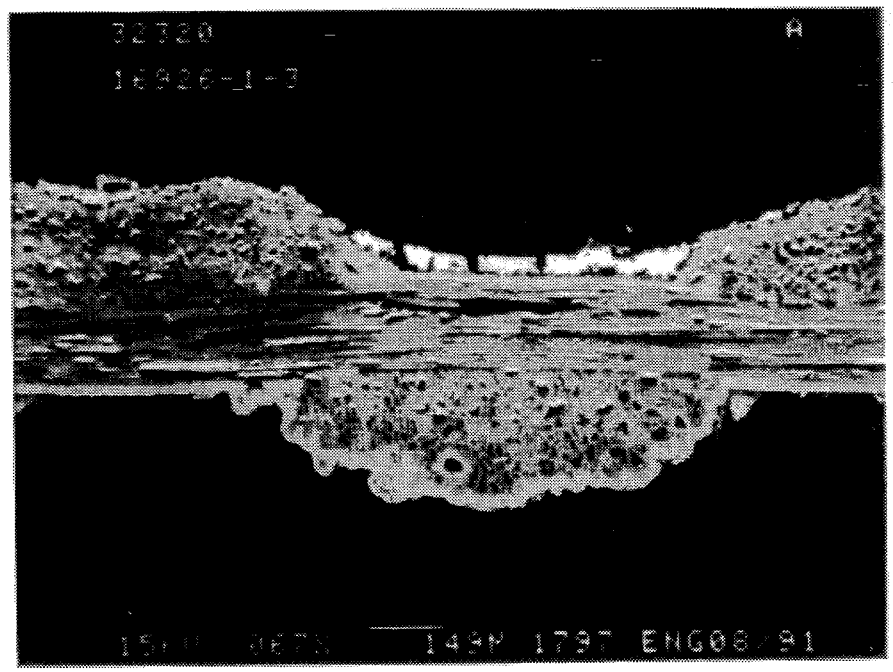

In SEM photographs of samples taken from the fresh and spent catalyst members B3 (comprising Type II substrates), FIGS. 5A and 5B, no loss of substrate appears to have occurred during the activity test; palladium was detected in both samples and there does not appear to be significant detrimental interaction between the catalyst material and the Type II substrate.

The foregoing data indicate that the catalyst material disposed on a Type II substrate employed in the downstream portion (catalyst members 3 and 4 in FIG. 2) of a catalyst bed exhibits less deterioration of the catalyst carrier, and less loss of catalytic material from the washcoat. However, the initial overall catalytic activity of a catalyst bed such as bed B comprising only Type II substrates is not as high as that of a catalyst bed (Bed A) comprising only Type I substrates.

EXAMPLE 2

To determine whether the relatively high catalytic activity of catalyst disposed on Type I substrates and the resistance to thermal degradation of catalyst members having Type II substrates could be effectively combined, four additional catalyst beds designated bed C, bed D, bed E and bed F were prepared, each comprising 2 or 3 catalyst members prepared as described above in Example I, and a separator body. TABLE IIA summarizes the configurations of the four catalyst beds.

TABLE IIA

| Catalyst Member | Substrate Type | Length | Washcoat |
|---|---|---|---|
| *Catalyst Bed C (Comparative)* | | | |
| C1 | I | 1.5" | 8 wt. % Pd on alumina |
| C2 | I | 1" | 8 wt. % Pd; 10% ceria/alumina |
| C3 | I | 1.5" | 7 wt. % 2La₂O₃.PdO/93% alumina |
| C4 | I | 1.5" | alumina |
| *Catalyst Bed D (Comparative)* | | | |
| D1 | Same as C1 | | Same as C1 |
| D2 | Same as C2 | | Same as C2 |
| D3 | I | 1.5" | alumina |
| D4 | I | 1.5" | alumina |
| *Catalyst Bed E* | | | |
| E1 | Same a C1 | | Same as C1 |
| E2 | Same as C2 | | Same as C2 |
| E3 | II | 1.5" | alumina |
| E4 | II | 1.5" | alumina |
| *Catalyst Bed F* | | | |
| F1 | Same as C1 | | Same as C1 |
| F2 | Same as C2 | | Same as C2 |
| F3 | II | 1.5" | 7 wt. % 2La₂O₃.PdO/ 93% alumina |
| F4 | ii | 1.5" | alumina |

All the Type I substrates in catalyst beds C, D, E and F had 64 cells per square inch, and all the Type II substrates had 60 cells per square inch. The washcoat loadings on the catalyst members of beds C, D, E and F was 1.5 g/in³.

The efficacy of each catalyst bed C, D, E and F was tested by placing the beds in a combustor to determine their respective initiation temperatures for a 4% methane in air combustion mixture. Two evaluations were performed for beds C and E, and three evaluations were made for catalyst beds D and F. The results are set forth below in TABLE IIB.

TABLE IIB

| | Ignition Conditions | | | |
|---|---|---|---|---|
| Cat. Bed | Inlet Temp.(°C.) | Init. Vel. (ft/s) | Fuel Conc. Vol. (%) | Extinction Temp.(°C.)/Fuel % |
| C | 480–500 | 50 | 4.0 | 462–480/4.0 |
|   | 420 | 30 | 4.0 | |
| D | 487–550 | 50 | 4.1–3.75 | |
|   | 530 | 60 | 4.0 | 496/4.0 |
|   | 485–495 | 30 | 4.0 | 465–485/4.0 |
| E | 512 | 60 | 4.0 | 506/4.0 |
|   | 550–578 | 50 | 4.0 | 515–520/4.0 |
| F | 475 | 60 | 4.0 | 452/4.0 |
|   | 504–545 | 50 | 4.0 | 487–515/4.0 |

TABLE IIB-continued

| | Ignition Conditions | | | |
|---|---|---|---|---|
| Cat. Bed | Inlet Temp.(°C.) | Init. Vel. (ft/s) | Fuel Conc. Vol. (%) | Extinction Temp.(°C.)/Fuel % |
| | 472–477 | 30 | 4.0 | 440/4.0 |

The data of TABLE IIB show that catalyst beds E and F according to preferred embodiments of the present invention provide catalytic activity comparable to that of catalyst beds C and D which do not comprise Type II substrates in the downstream catalyst members, i.e., which comprise Type I catalyst beds throughout. This is surprising, in view of the higher catalytic activity attained by Type I catalyst members as compared to Type II catalyst members, as demonstrated above.

The foregoing catalyst beds C, D, E and F were aged by placing them in a combustor and passing a combustion mixture comprising 4% methane in air at an inlet linear velocity of 30 to 60 feet per second to initiate combustion for a period of 4 to 20 hours. Segments C3, C4, D3 and D4 all had visually discernable structural cracks, but segments E3, E4, F3 and F4 appeared to be intact. Thereafter, samples of the spent catalyst members were examined by scanning electron microscope and compared against fresh (unaged) samples for visual evidence of deterioration. In some cases, samples were taken from both the inlet end and the outlet end of a particular catalyst member.

Figure 6A:
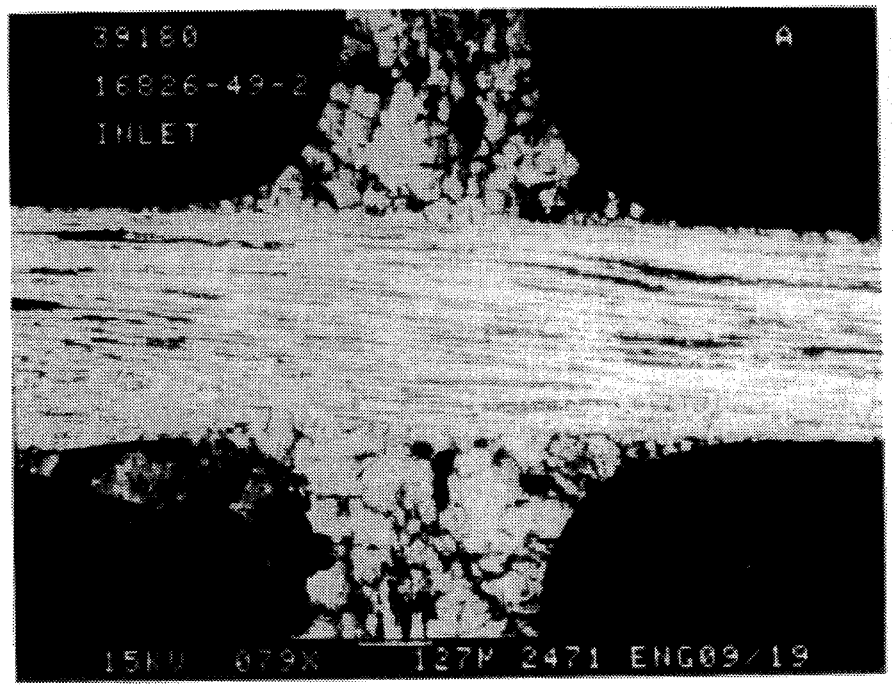
FIGS. 6A and 6B are SEM photographs of cross sections taken from the inlet and outlet ends, respectively, of spent catalyst member C3 of Example 2 (Run 63)
Figure 6B:
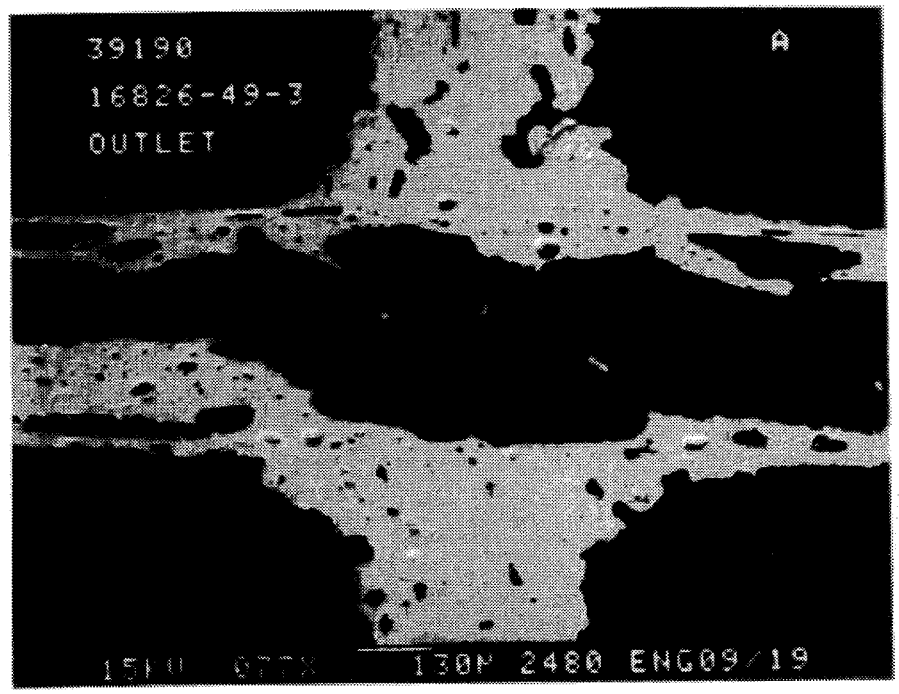
Figure 6C:
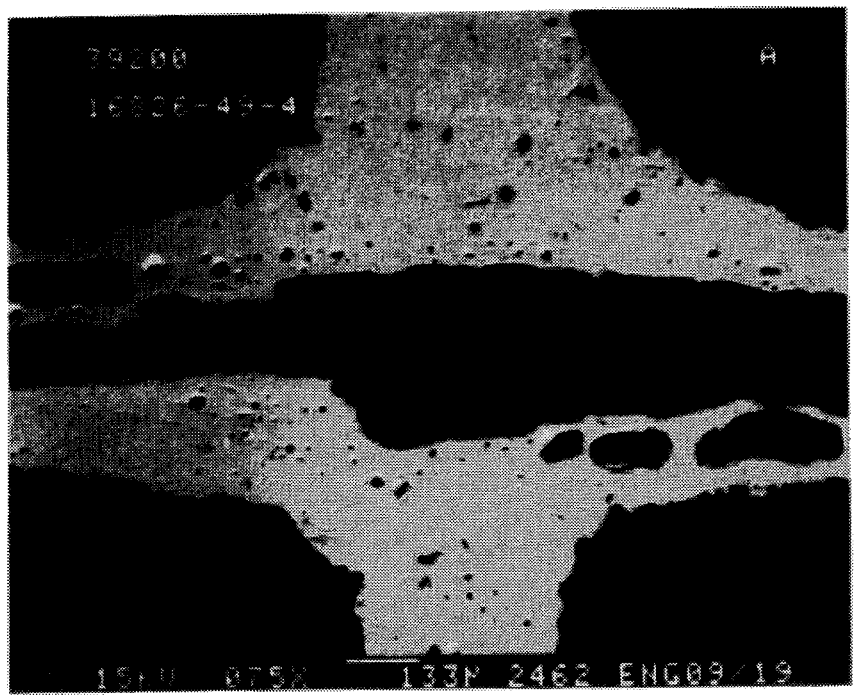
FIGS. 6C and 6D are SEM photographs of cross sections of spent catalyst member C4 and a fresh catalyst member, respectively, of Example 2 (Run 63)
Figure 6D:
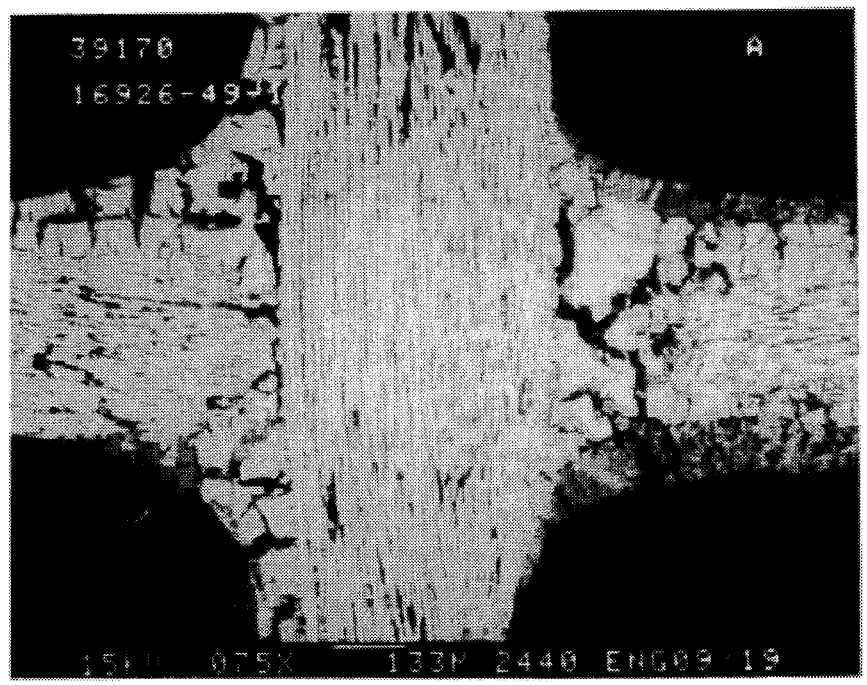

FIG. 6A and FIG. 6B are SEM photographs of a cross section of spent catalyst member C3 taken at the inlet and outlet ends, respectively, and clearly reveal that the outlet end of catalyst member C3 suffered greater deterioration than the inlet end. FIG. 6C is a SEM photograph of a cross section of the spent catalyst member C4 showing evidence of deterioration and catalyst-substrate interaction with the Type I substrate therein. FIG. 6D is a view similar to FIG. 6C of a fresh, i.e., unused, catalyst member of the same composition. Energy Dispersion Spectroscopy ("EDS") showed a loss of palladium on the catalyst material of catalyst member C3. FIGS. 6A–6D thus confirm that Type I substrates disposed in the downstream portion of the catalyst bed interact under operating conditions with the active layer thereon with a tendency toward greater interaction at more downstream positions.

Figure 7A:
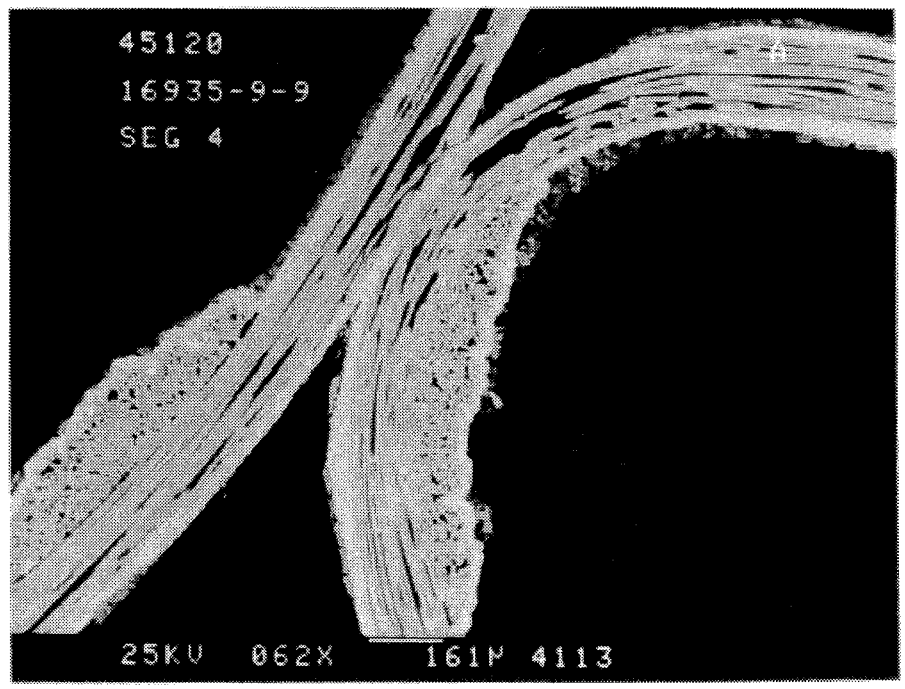
FIGS. 7A and 7B are SEM photographs of cross sections taken from catalyst members E3 and E4, respectively, of Example 2 after aging.
Figure 7B:
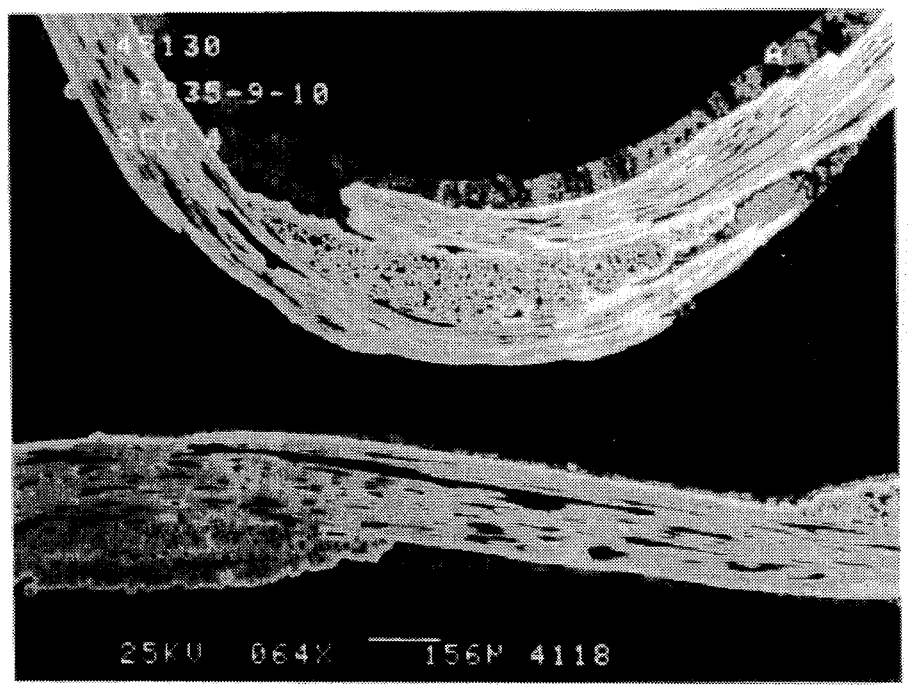
Figure 8A:
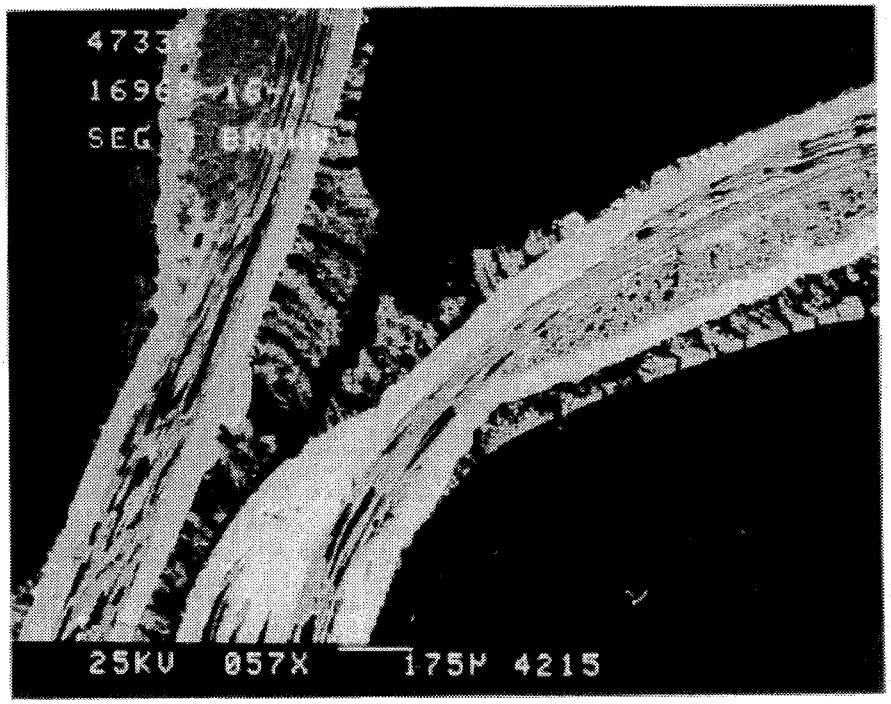
FIGS. 8A and 8B are SEM photographs of cross sections of the inlet and outlet ends, respectively, of catalyst member F3 of Example 2, after aging.
Figure 8B:

FIGS. 7A and 7B are SEM photographs of cross sections of catalyst members E3 and E4 showing little deterioration and catalyst material-substrate interaction. FIGS. 8A and 8B are SEM photographs of cross sections of the inlet and outlet ends of catalyst member F3 showing no loss of palladium at either end. Thus, FIGS. 7A, 7B, 8A and 8B confirm the resistance of Type II substrates to detrimental interaction with the active layer thereon under conditions which would result in degradation of Type I substrates.

Although it is believed that the catalyst material on members C3 and F3 degraded during their respective combustor runs, and thus became catalytically inactive, it was apparent that member F3 retained more palladium than did member C3, as would be expected in view of the bulk assay results of Example 1. Therefore, in the event that the upstream catalyst members failed and the catalyst beds cool sufficiently to allow the catalyst material on members C3 or F3 to regenerate, it is likely that bed F would show better performance after regeneration then bed C, due to the greater quantity of palladium retained in segment F3.

While the invention has been described with reference to particular embodiments thereof, it will be appreciated that numerous variations to the described embodiments will be within the scope of the appended claims.

What is claimed is:

1. A combustor for catalytically promoting thermal combustion of an inlet combustion gas mixture flowed therethrough in a flow path which passes sequentially through a catalyst zone and then a downstream zone of the combustor, a homogeneous reaction zone being disposed within the downstream zone, and the combustor comprising: a catalyst body disposed in the catalyst zone and comprising at least a first catalyst member and a second catalyst member, the first catalyst member being comprised of a first carrier having a plurality of gas flow channels extending therethrough and defined by channel walls on which a first catalyst composition is carried, and the second catalyst member being disposed downstream of the first catalyst member and being comprised of a second carrier having a plurality of gas flow channels extending therethrough and defined by channel walls on which a second catalyst composition is carried;

wherein the first carrier comprises a silica-magnesia-alumina material comprising primarily a mixture of cordierite, and wherein the second carrier comprises a ceramic fiber matrix material comprising ceramic fibers, the composition of which comprises alumina, boron oxide and silica, the fibers being fixed in a silicon carbide matrix.

2. The combustor of claim 1 wherein the silica-magnesia-alumina material comprises about 20 to 40 weight percent $SiO_2$, about 3 to 6 weight percent MgO and about 54 to 77 weight percent $Al_2O_3$, with from about 50 to 90 percent by weight of each of said $SiO_2$, MgO and $Al_2O_3$ comprising crystalline material of said cordierite, mullite, and corundum, the balance comprising amorphous material.

3. The combustor of claim 2 wherein the crystalline material comprises about 15 to 40 percent by weight cordierite, about 15 to 35 percent by weight corundum and about 10 to 30 percent by weight mullite, based on the weight of the carrier.

4. The combustor of claim 1, claim 2 or claim 3 wherein the fibers of the ceramic fiber matrix material comprise about 62 weight percent alumina, 14 weight percent boron oxide and 24 weight percent silica.

5. The combustor of claim 1 wherein the first catalyst member and the second catalyst member comprise respective discrete bodies disposed in proximity to each other.

6. The combustor of claim 1 wherein the first catalyst member and the second catalyst member comprise respective discrete bodies disposed in abutting contact with each other.

7. The combustor of claim 1 wherein the first catalyst composition comprises palladium oxide dispersed on a first refractory metal oxide support.

8. The combustor of claim 7 wherein the first refractory metal oxide support is selected from the group consisting of one or more of unimpregnated alumina, alumina impregnated with a rare earth metal oxide, unimpregnated zirconia, zirconia impregnated with a rare earth metal oxide, silica, titania, and a co-formed rare earth metal oxide-zirconia.

9. The combustor of claim 1 wherein the first catalyst composition comprises palladium oxide dispersed on a first refractory metal oxide support and the second catalyst composition comprises palladium oxide dispersed on a second refractory metal oxide support.

10. The combustor of claim 9 wherein the first refractory metal oxide support comprises unimpregnated alumina and the second refractory metal oxide support comprises alumina impregnated with a rare earth metal oxide.

11. The combustor of claim 9 wherein both the first and second refractory metal oxide supports comprise alumina impregnated with a rare earth metal oxide.

12. The combustor of claim 1 wherein the first catalyst composition comprises palladium oxide dispersed on a refractory metal oxide support and the second catalyst composition comprises a combination of (i) the reaction product of palladium oxide and a metal oxide selected from the group consisting of one or more of samaria, lanthana and praseodymia admixed with (ii) a refractory metal oxide binder.

13. The combustor of claim 1 further comprising an intermediate catalyst member disposed in the catalyst zone between the first catalyst member and the second catalyst member and comprising a carrier comprising the silica-magnesia-alumina material and having a plurality of gas flow channels therethrough and defined by channel walls on which is disposed a internal catalyst composition.

14. The combustor of claim 13 wherein the first catalyst composition and the intermediate catalyst composition each comprises palladium oxide dispersed, respectively, on first and intermediate refractory metal oxide supports, and wherein the second catalyst composition is selected from the group consisting of (a) palladium oxide dispersed on a refractory metal oxide support and (b) a combination of (i) the reaction product of palladium oxide and a metal oxide selected from the group consisting of one or more of samaria, lanthana and praseodymia admixed with (ii) a refractory metal oxide binder.

15. The combustor of claim 14 wherein the second catalyst composition comprises the combination of (b) and wherein the refractory metal oxide binder of (ii) is selected from the group consisting of one or more of silica, alumina, alumina impregnated with a rare earth metal oxide, titania and zirconia, and combinations thereof.

16. The combustor of claim 14 or claim 15 wherein at least one of the first refractory metal oxide support and the intermediate refractory metal oxide support comprises alumina impregnated with a rare earth metal oxide.

17. The combustor of claim 16 wherein the first refractory metal oxide support comprises unimpregnated alumina.

18. The combustor of claim 16 wherein the first refractory metal oxide support and the intermediate refractory metal oxide support both comprise alumina impregnated with a rare earth metal oxide.

19. The combustor of claim 16 wherein the rare earth oxide in one or both of the first refractory metal oxide support and the second refractory metal oxide support is selected from the group consisting of lanthana, ceria, praseodymia and combinations thereof.

20. The combustor of claim 1 or claim 13 further comprising a third catalyst member disposed in the catalyst zone downstream of the second catalyst member and comprising a carrier comprising a ceramic fiber matrix material and having a plurality of gas flow channels therethrough defined by channel walls on which is disposed a third catalyst composition, the ceramic fiber matrix comprising ceramic fibers, the composition of which comprises alumina, boron oxide and silica, the fibers being fixed in a silicon carbide matrix.

21. The combustor of claim 20 wherein the first catalyst composition comprises palladium oxide dispersed on a refractory metal oxide support and wherein the second catalyst composition and the third catalyst composition are each selected from the group consisting of (a) palladium oxide dispersed on a refractory metal oxide support and (b) a combination of (i) the reaction product of palladium oxide and a metal oxide selected from the group consisting of one or more of samaria, lanthana, and praseodymia admixed with (ii) a refractory metal oxide binder.

22. The combustor of claim 21 wherein the refractory metal oxide binder of (ii) is selected from the group consisting of silica, alumina, alumina impregnated with a rare earth metal oxide, titania, zirconia and combinations thereof.

23. The combustor of claim 10 or claim 11 wherein the rare earth metal oxide is selected from the group consisting of lanthana, ceria, praseodymia and combinations thereof.

* * * * *